US011401373B2

(12) United States Patent
Lehenmeier et al.

(10) Patent No.: US 11,401,373 B2
(45) Date of Patent: *Aug. 2, 2022

(54) CONTINUOUS METHOD FOR PRODUCING AN ALIPHATIC POLYESTER

(71) Applicant: BASF SE, Ludwigshafen am Rhein (DE)

(72) Inventors: Maximilian Lehenmeier, Ludwigshafen am Rhein (DE); Norbert Effen, Ludwigshafen am Rhein (DE); Gabriel Skupin, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/765,849

(22) PCT Filed: Nov. 15, 2018

(86) PCT No.: PCT/EP2018/081399
§ 371 (c)(1),
(2) Date: May 20, 2020

(87) PCT Pub. No.: WO2019/096918
PCT Pub. Date: May 23, 2019

(65) Prior Publication Data
US 2020/0362101 A1 Nov. 19, 2020

(30) Foreign Application Priority Data

Nov. 20, 2017 (EP) ..................... 17202537

(51) Int. Cl.
*C08G 63/90* (2006.01)
*C08G 63/78* (2006.01)

(52) U.S. Cl.
CPC ............. *C08G 63/78* (2013.01); *C08G 63/90* (2013.01)

(58) Field of Classification Search
USPC .......................... 528/302, 193, 194, 271, 272
See application file for complete search history.

(56) References Cited

U.S. PATENT DOCUMENTS

| 3,068,206 | A | 12/1962 | Nicolson et al. |
| 5,779,986 | A | 7/1998 | Van et al. |
| 2002/0002252 | A1* | 1/2002 | Obuchi ................ C08K 5/20 |
| | | | 525/450 |
| 2002/0052462 | A1 | 5/2002 | Masuda et al. |

FOREIGN PATENT DOCUMENTS

| DE | 19929790 A1 | 1/2001 |
| DE | 10158312 A1 | 6/2003 |
| EP | 0228399 A1 | 7/1987 |
| EP | 0579988 A1 | 1/1994 |
| EP | 0719582 A2 | 7/1996 |
| EP | 2228399 A1 | 9/2010 |
| EP | 2623540 A1 | 8/2013 |
| WO | 87/00030 A1 | 1/1987 |
| WO | 03/42278 A1 | 5/2003 |
| WO | 03/46044 A1 | 6/2003 |
| WO | 2005/042615 A1 | 5/2005 |
| WO | 2009/127555 A1 | 10/2009 |
| WO | 2009/127556 A1 | 10/2009 |
| WO | 2014/195176 A1 | 12/2014 |
| WO | 2019/096920 A1 | 5/2019 |

OTHER PUBLICATIONS

Dr. Witte, et al., "Simple Synthesis of 2-Substituted 2-Oxazolines and 5,6-Dihydro-4H-1,3-oxazines", Angewandte Chemie International Edition, vol. 11, Issue 4, Apr. 1972, pp. 287-288.
European Search Report for EP Patent Application No. 17202537.1, dated Apr. 26, 2018, 3 pages.
International Search Report and Written Opinion received for PCT Patent Application No. PCT/EP2018/081399, dated Jan. 16, 2019, 12 pages (2 pages of English Translation and 10 pages of Original Document).

* cited by examiner

*Primary Examiner* — Terressa Boykin
(74) *Attorney, Agent, or Firm* — Faegre Drinker Biddle & Reath LLP

(57) ABSTRACT

The invention relates to a continuous process for producing an aliphatic polyester constructed from aliphatic dicarboxylic acids and aliphatic diols comprising the steps of a) esterification, b) polycondensation and optionally c) chain extension, characterized in that during step b) in which the polycondenser functions as a degassing apparatus (B) and/or b') after the polycondensation in an additional degassing apparatus (B') the crude polyester is degassed at a pressure of 0.01 to 5 mbar in the presence of 1% to 7% by weight, based on the total weight of the crude polyester of water, introduced into the gas space of the degassing apparatus B and/or B' as an entraining agent.

17 Claims, No Drawings

CONTINUOUS METHOD FOR PRODUCING AN ALIPHATIC POLYESTER

CROSS-REFERENCE TO RELATED APPLICATIONS

This application is a national stage application (under 35 U.S.C. § 371) of PCT/EP2018/081399, filed Nov. 15, 2018, which claims benefit of European Application No. 17202537.1, filed Nov. 20, 2017, both of which are incorporated herein by reference in their entirety.

The invention relates to a continuous process for producing an aliphatic polyester constructed from aliphatic dicarboxylic acids and aliphatic diols comprising the steps of a) esterification, b) polycondensation and optionally c) chain extension, characterized in that during step b) in which the polycondenser functions as a degassing apparatus (B) and/or b') after the polycondensation in an additional degassing apparatus (B') the crude polyester is degassed at a pressure of 0.01 to 5 mbar in the presence of 1% to 7% by weight, based on the total weight of the crude polyester, of water introduced into the gas space of the degassing apparatus B and/or B' as an entraining agent.

Continuous processes for producing aliphatic polyesters such as polybutylene succinate (PPS), polybutylene succinate-co-adipate (PBSA) or polybutylene succinate-co-sebacate (PBSSe) are known from the literature (see WO-A 2009/127555 and EP-A 2228399). These documents describe the depletion of tetrahydrofuran formed and EP-A 2228399 also describes the depletion of cyclic dimers. However, the processes described in these documents do not result in sufficient depletion of the cyclic byproducts to obtain for example approval for contact with foodstuffs according to EU 10/2011.

In order to deplete the aliphatic polyesters of cyclic byproducts to a greater extent, EP-A 2623540 developed a process which extracts the byproducts in the polyester granulate by extraction with solvents in a downstream purification step. The disadvantage of this extraction process is that impurities trapped in the granulate cannot be depleted and contamination of the polyester with solvents can result. This process is altogether rather complex and costly.

The present invention accordingly has for its object to find an efficient and scaleable continuous process for producing aliphatic polyesters which does not have the above-described disadvantages.

The inventors have surprisingly found a continuous process for producing an aliphatic polyester constructed from aliphatic dicarboxylic acids and aliphatic diols comprising the steps of a) esterification, b) polycondensation and optionally c) chain extension, characterized in that during step b) in which the polycondenser functions as a degassing apparatus (B) and/or b') after the polycondensation in an additional degassing apparatus (B') the crude polyester is degassed at a pressure of 0.01 to 5 mbar in the presence of 1% to 7% by weight, based on the total weight of the crude polyester, of water introduced into the gas space of the degassing apparatus B and/or B' as an entraining agent.

The invention is more particularly described hereinbelow.

Aliphatic polyesters are for example produced—as described in WO-A 2009/127555 and EP-A 2228399—in a manner comprising the steps of a) esterification, b) polycondensation and optionally c) chain extension.

In a preliminary step a mixture of the aliphatic dihydroxyl compounds, the aliphatic dicarboxylic acids and optionally further comonomers, preferably without the addition of the catalyst, is mixed to afford a paste or slurry and preferably brought to a temperature of 20° C. to 90° C. or alternatively the liquid mixture of esters of the dicarboxylic acids and dihydroxyl compound and optionally further comonomers, preferably without addition of a catalyst, is continually introduced into a reactor for esterification (pre-condensation) and a) continuously esterified/transesterified with the total amount or a sub-amount of the catalyst and pre-condensed up to a viscosity number according to DIN 53728 of preferably 20 to 70 cm$^3$/g;

b) the product obtainable from a) is polycondensed in a polycondenser B up to a viscosity number according to DIN 53728 of preferably 60 to 170 cm$^3$/g and this polycondensed product is optionally degassed in a degassing apparatus B';

and optionally c) in a further step the product obtainable from b) or b') is reacted with a chain extender C up to a viscosity number according to DIN 53728 of preferably 150 to 320 cm$^3$/g;

wherein in step b) in the polycondenser B or after step b) in a degassing apparatus B' suitable therefor the crude polyester is degassed at a pressure of 0.01 to 5 mbar in the presence of 1% to 7% by weight based on the total weight of the crude polyester of an entraining agent.

Aliphatic polyesters are to be understood as meaning polyesters constructed predominantly from monomeric aliphatic dicarboxylic acids and aliphatic diols.

Contemplated aliphatic dicarboxylic acids or ester-forming derivatives thereof in general include those having 2 to 40 carbon atoms, preferably 4 to 14 carbon atoms. They may preferably be linear or branched. The cycloaliphatic dicarboxylic acids usable in the context of the present invention are generally those having 7 to 10 carbon atoms and in particular those having 8 carbon atoms. However, it is also possible in principle to employ dicarboxylic acids having a greater number of carbon atoms, for example having up to 30 carbon atoms.

Examples include: malonic acid, succinic acid, glutaric acid, 2-methylglutaric acid, 3-methylglutaric acid, adipic acid, pimelic acid, suberic acid, azelaic acid, sebacic acid, undecanedioic acid, dodecanedioic acid, brassylic acid, tetradecanedioic acid, fumaric acid, 2,2-dimethylglutaric acid, suberic acid, dimer fatty acid (for example Empol® 1061 from BASF), 1,3-cyclopentanedicarboxylic acid, 1,4-cyclohexanedicarboxylic acid, 1,3-cyclohexanedicarboxylic acid, diglycolic acid, itaconic acid, maleic acid, maleic anhydride and 2,5-norbornanedicarboxylic acid.

Likewise employable ester-forming derivatives of the abovementioned aliphatic or cycloaliphatic dicarboxylic acids include in particular di-$C_1$- to $C_6$-alkyl esters, such as dimethyl, diethyl, di-n-propyl, diisopropyl, di-n-butyl, diisobutyl, di-t-butyl, di-n-pentyl, diisopentyl or di-n-hexyl esters. Anhydrides of the dicarboxylic acids may likewise be employed.

These dicarboxylic acids or the ester-forming derivatives thereof may be used individually or as a mixture of two or more thereof.

It is preferable to employ succinic acid, adipic acid, azelaic acid, sebacic acid, brassylic acid or their respective ester-forming derivatives or mixtures thereof. It is particularly preferable to employ succinic acid, adipic acid or sebacic acid or their respective ester-forming derivatives or mixtures thereof. It is particularly preferable to employ succinic acid or mixtures of succinic acid with preferably up to 25 mol % of adipic acid or preferably up to 10 mol % of sebacic acid or their ester-forming derivatives, such as their alkyl esters.

Succinic acid, azelaic acid, sebacic acid and brassylic acid additionally have the advantage that they are obtainable as renewable raw materials.

Aliphatic diols are generally to be understood as meaning branched or preferably linear alkanediols having 2 to 12 carbon atoms, preferably 3 to 6 carbon atoms.

Examples of suitable alkanediols are ethylene glycol, 1,2-propanediol, 1,3-propanediol, 1,2-butanediol, 1,4-butanediol, 1,5-pentanediol, 1,6-hexanediol 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, especially ethylene glycol, 1,3-propanediol, 1,4-butanediol and 2,2-dimethyl-1,3-propanediol (neopentyl glycol); cyclopentanediol, 1,4-cyclohexanediol, 1,2-cyclohexanedimethanol, 1,3-cyclohexanedimethanol, 1,4-cyclohexanedimethanol or 2,2,4,4-tetramethyl-1,3-cyclobutanediol. 1,4-butanediol are particularly preferred. Mixtures of different alkanediols may also be employed.

In the process steps: preliminary step and esterification a) a ratio of diol to dicarboxylic acid of generally 1.0 to 2.5 and preferably 1.2 to 2.2 is established.

The aliphatic polyesters may further comprise a branching agent comprising at least three functional groups. Particularly preferred branching agents have three to six hydroxyl groups or carboxylic acid groups. Examples include: tartaric acid, citric acid, malic acid; trimethylolpropane, trimethylolethane; pentaerythritol; polyethertriols and glycerol, trimesic acid, trimellitic acid, trimellitic anhydride, pyromellitic acid and pyromellitic dianhydride. Preference is given to polyols such as trimethylolpropane, pentaerythritol and especially glycerol. The branching agents make it possible to construct biodegradable polyesters having a structural viscosity. The rheological behavior of the melts improves; the polyesters are easier to process, for example are more readily drawable into films by melt solidification. The branching agents have a shear-thinning effect, i.e. viscosity under load decreases.

The branching agents are preferably employed in amounts of 0.01% to 2% by weight, preferably 0.05% to 1% by weight, particularly preferably 0.08% to 0.20% by weight, based on the polymer amount after step a).

In addition to the dicarboxylic acids and diols the aliphatic polyesters may comprise further of the following components selected from the group consisting of: dihydroxyl compound and hydroxycarboxylic acid.

Suitable dihydroxyl compounds include diethylene glycol, triethylene glycol, polyethylene glycol, polypropylene glycol and polytetrahydrofuran (poly-THF), particularly preferably diethylene glycol, triethylene glycol and polyethylene glycol, it also being possible to employ mixtures thereof or compounds having differing variables n (see formula I), for example polyethylene glycol comprising propylene units (n=3), for example obtainable by polymerization according to methods known per se initially of ethylene oxide and subsequently with propylene oxide, particularly preferably a polymer based on polyethylene glycol having differing variables n, wherein units formed from ethylene oxide predominate. The molecular weight ($M_n$) of the polyethylene glycol is generally in the range from 250 to 8000, preferably from 600 to 3000 g/mol.

In one of the preferred embodiments it is possible to employ for example 15 to 98 mol %, preferably 70 to 99.5 mol %, of a diol and 0.2 to 85 mol %, preferably 0.5 to 30 mol %, of the dihydroxyl compounds recited hereinabove for production of the polyesters.

Production of polyesters may employ a hydroxycarboxylic acid such as: glycolic acid, D-lactic acid, L-lactic acid, D,L-lactic acid, 6-hydroxyhexanoic acid, cyclic derivatives thereof such as glycolide (1,4-dioxane-2,5-dione), D- or L-dilactide (3,6-dimethyl-1,4-dioxane-2,5-dione), p-hydroxybenzoic acid and also their oligomers and polymers such as 3-polyhydroxybutyric acid, polyhydroxyvaleric acid, polylactide (obtainable for example as Ingeo® (NatureWorks)), the low molecular weight and cyclic derivatives thereof being particularly preferable for production of aliphatic polyesters.

The hydroxycarboxylic acids may be employed for example in amounts from 0.01% to 50% by weight, preferably from 0.1% to 15% by weight, based on the amount of the monomers.

The use of chain extenders C is optional and is typically effected at the end of the polycondensation in a separate step c).

Employable as component C1 are an isocyanate or a mixture of different isocyanates. Aromatic or aliphatic diisocyanates may be employed. However, it is also possible to employ higher-functional isocyanates.

In the context of the present invention an aromatic diisocyanate C1 is to be understood as meaning especially tolylene 2,4-diisocyanate, tolylene 2,6-diisocyanate, 2,2'-diphenylmethane diisocyanate, 2,4'-diphenylmethane diisocyanate, 4,4'-diphenylmethane diisocyanate, naphthylene 1,5-diisocyanate or xylylene diisocyanate.

Particularly preferred as component C1 among these are 2,2'-, 2,4'- and 4,4'-diphenylmethane diisocyanate. The latter diisocyanates are generally employed as mixtures.

Also contemplated as tricyclic isocyanate C1 is tri(4-isocyanatophenyl)methane. The polycyclic aromatic diisocyanates are generated for example in the production of monocyclic or bicyclic diisocyanates.

The component C may also comprise urethione groups in subordinate amounts, for example up to 5% by weight, based on the total weight of the component C, for example for capping the isocyanate groups.

In the context of the present invention an aliphatic diisocyanate C1 is to be understood as meaning especially linear or branched alkylene diisocyanates or cycloalkylene diisocyanates having 2 to 20 carbon atoms, preferably 3 to 12 carbon atoms, for example 1,6-hexamethylene diisocyanate, isophorone diisocyanate or methylenebis(4-isocyanatocyclohexane). Particularly preferred aliphatic diisocyanates C are isophorone diisocyanate and in particular 1,6-hexamethylene diisocyanate.

Preferred isocyanurates C1 include the aliphatic isocyanurates deriving from alkylene diisocyanates or cycloalkylene diisocyanates having 2 to 20 carbon atoms, preferably 3 to 12 carbon atoms, for example isophorone diisocyanate or methylenebis(4-isocyanatocyclohexane). The alkylene diisocyanates may be either linear or branched. Particular preference is given to isocyanurates based on n-hexamethylenediisocyanate, for example cyclic trimers, pentamers or higher oligomers of 1,6-hexamethylene diisocyanate.

The component C1 may generally be employed in amounts of 0.01% to 4% by weight, preferably 0.05% to 2% by weight, particularly preferably 0.2% to 1.2% by weight, based on the polymer amount after step b).

Suitable di- or oligofunctional peroxides (component C2) include for example the following compounds: benzoyl peroxide, 1,1-bis(t.-butylperoxy)-3,3,5-trimethylcyclohexane, 1,1-bis(t.-butylperoxy)methylcyclododecane, n-butyl-4,4-bis(butylperoxy)valerate, dicumyl peroxide, t.-butyl peroxybenzoate, dibutyl peroxide, α,α-bis(t.-butylperoxy)diisopropylbenzene, 2,5-dimethyl-2,5-di(t.-butylperoxy)hexane, 2,5-dimethyl-2,5-di(t.-butylperoxy)hex-3-yne and t.-butyl peroxycumene.

The component C2 is employed at 0.01% to 4% by weight, preferably at 0.1% to 2% by weight and particularly preferably at 0.2% to 1% by weight based on the polyester.

Suitable as component C3 are difunctional or oligofunctional epoxies such as: hydroquinone, diglycidyl ethers, resorcinol diglycidyl ethers, 1,6-hexanediol diglycidyl ether and hydrogenated bisphenol A diglycidyl ether. Other examples of epoxides comprise diglycidyl terephthalate, diglycidyl tetrahydrophthalate, diglycidyl hexahydrophthalate, dimethyldiglycidyl phthalate, phenylene diglycidyl ether, ethylene diglycidyl ether, trimethylene diglycidyl ether, tetramethylene diglycidyl ether, hexamethylene diglycidyl ether, sorbitol diglycidyl ether, polyglycerol polyglycidyl ether, pentaerythritol polyglycidyl ether, diglycerol polyglycidyl ether, glycerol polyglycidyl ether, trimethylolpropane polyglycidyl ether, resorcinol diglycidyl ether, neopentyl glycol diglycidyl ether, ethylene glycol diglycidyl ether, diethylene glycol diglycidyl ether, polyethylene glycol diglycidyl ether, propylene glycol diglycidyl ether, dipropylene glycol diglycidyl ether, polypropylene glycol diglycidyl ether, and polybutylene glycol diglycidyl ether.

Especially suitable as component C3a is an epoxy-containing copolymer based on styrene, acrylic ester and/or methacrylic ester d3a. The epoxy-bearing units are preferably glycidyl (meth)acrylates. Copolymers having a glycidyl methacrylate proportion of greater than 20%, particularly preferably of greater than 30% and especially preferably of greater than 50% by weight of the copolymer have proven advantageous. The epoxy equivalent weight (EEW) in these polymers is preferably 150 to 3000 and especially preferably 200 to 500 g/equivalent. The average molecular weight (weight-average) Mw of the polymers is preferably 2000 to 25 000, in particular 3000 to 8000. The average molecular weight (number-average) $M_n$ of the polymers is preferably 400 to 6000, in particular 1000 to 4000. The polydispersity (Q) is generally between 1.5 and 5. Epoxy-containing copolymers of the abovementioned type are for example marketed by BASF Resins B.V. under the Joncryl® ADR brand. A particularly suitable chain extender is Joncryl® ADR 4368.

The component C3 is employed at 0.01% to 4% by weight, preferably at 0.1% to 2% by weight and particularly preferably at 0.2% to 1% by weight based on the polyester.

Contemplated as component C4 are di- or oligo-functional oxazolines, oxazines, caprolactams and/or carbodiimides.

Bisoxazolines are generally obtainable by the process from Angew. Chem. Int. Ed., vol. 11 (1972), pages 287-288. Particularly preferred bisoxazolines and bisoxazines are those in which the bridging member represents a single bond, a (CH$_2$)$_z$-alkylene group where z=2, 3 or 4 such as methylene, ethane-1,2-diyl, propane-1,3-diyl, propane-1,2-diyl, or a phenylene group. Particularly preferred bisoxazolines include 2,2'-bis(2-oxazoline), bis(2-oxazolinyl)methane, 1,2-bis(2-oxazolinyl)ethane, 1,3-bis(2-oxazolinyl)propane or 1,4-bis(2-oxazolinyl)butane, in particular 1,4-bis(2-oxazolinyl)benzene, 1,2-bis(2-oxazolinyl)benzene or 1,3-bis(2-oxazolinyl)benzene. Further examples are: 2,2'-bis(2-oxazoline), 2,2'bis(4-methyl-2-oxazoline), 2,2'-bis(4,4'-dimethyl-2-oxazoline), 2,2'-bis(4-ethyl-2-oxazoline), 2,2'-bis(4,4'-diethyl-2-oxazoline), 2,2'-bis(4-propyl-2-oxazoline), 2,2'-bis(4-butyl-2-oxazoline), 2,2'-bis(4-hexyl-2-oxazoline), 2,2'-bis(4-phenyl-2-oxazoline), 2,2'-bis(4-cyclohexyl-2-oxazoline), 2,2'-bis(4-benzyl-2-oxazoline), 2,2'-p-phenylenebis(4-methyl-2-oxazoline), 2,2'-p-phenylenebis(4,4'dimethyl-2-oxazoline), 2,2'-m-phenylenebis(4-methyl-2-oxazoline), 2,2'-m-phenylenebis(4,4'-dimethyl-2-oxazoline), 2,2'-hexamethylenebis(2-oxazoline), 2,2'-octamethylenebis(2-oxazoline), 2,2'-decamethylenebis(2-oxazoline), 2,2'-ethylenebis(4-methyl-2-oxazoline), 2,2'-tetramethylenebis(4,4'-dimethyl-2-oxazoline), 2,2'-9,9'-diphenoxyethanebis(2-oxazoline), 2,2'-cyclohexylenebis(2-oxazoline), and 2,2'-diphenylenebis(2-oxazoline).

Preferred bisoxazines are 2,2'-bis(2-oxazine), bis(2-oxazinyl)methane, 1,2-bis(2-oxazinyl)ethane, 1,3-bis(2-oxazinyl)propane, or 1,4-bis(2-oxazinyl)butane, in particular 1,4-bis(2-oxazinyl)benzene, 1,2-bis(2-oxazinyl)benzene, or 1,3-bis(2-oxazinyl)benzene.

Carbodiimides and polymeric carbodiimides are marketed by Lanxess under the brand name Stabaxol® for example.

Examples are: N,N'-di-2,6-diisopropylphenylcarbodiimide, N,N'-di-o-tolylcarbodiimide, N,N'-diphenylcarbodiimide, N,N'-dioctyldecylcarbodiimide, N,N'-di-2,6-dimethylphenylcarbodiimide, N-tolyl-N'-cyclohexylcarbodiimide, N,N'-di-2,6-di-tert-butylphenylcarbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-dicyclohexylcarbodiimide, N,N'-di-p-tolylcarbodiimide, p-phenylenebisdi-o-tolylcarbodiimide, p-phenylenebisdicyclohexylcarbodiimide, hexamethylenebisdicyclohexylcarbodiimide, 4,4'-dicyclohexylmethanecarbodiimide, ethylenebisdiphenylcarbodiimide, N,N'-benzylcarbodiimide, N-octadecyl-N'-phenylcarbodiimide, N-benzyl-N'-phenylcarbodiimide, N-octadecyl-N'-tolylcarbodiimide, N-cyclohexyl-N'-tolylcarbodiimide, N-phenyl-N'-tolylcarbodiimide, N-benzyl-N'-tolylcarbodiimide, N,N'-di-o-ethylphenylcarbodiimide, N,N'-di-p-ethylphenylcarbodiimide, N,N'-di-o-isopropylphenylcarbodiimide, N,N'-di-p-isopropylphenylcarbodiimide, N,N'-di-o-isobutylphenylcarbodiimide, N,N'-di-p-isobutylphenylcarbodiimide, N,N'-di-2,6-diethylphenylcarbodiimide, N,N'-di-2-ethyl-6-isopropylphenylcarbodiimide, N,N'-di-2-isobutyl-6-isopropylphenylcarbodiimide, N,N'-di-2,4,6-trimethylphenylcarbodiimide, N,N'-di-2,4,6-triisopropylphenylcarbodiimide, N,N'-di-2,4,6-triisobutylphenylcarbodiimide, diisopropylcarbodiimide, dimethylcarbodiimide, diisobutylcarbodiimide, dioctylcarbodiimide, tert-butylisopropylcarbodiimide, di-β-naphthylcarbodiimide and di-tert-butylcarbodiimide.

The component C4 is employed at 0.01% to 4% by weight, preferably at 0.1% to 2% by weight and particularly preferably at 0.2% to 1% by weight based on the polyester.

Preference is given to aliphatic polyesters i comprising the following components:
- i-a) 90 to 100 mol % based on the components i-a to i-b of succinic acid;
- i-b) 0 to 10 mol % based on the components i-a to i-b of one or more 0$_6$-020 dicarboxylic acids and especially preferably adipic acid, azelaic acid, sebacic acid or brassylic acid;
- i-c) 99 to 100 mol % based on the components i-a to i-b of 1,3-propanediol or especially preferably 1,4-butanediol;
- i-d) 0% to 1% by weight based on the components i-a to i-c of a chain extender and/or branching agent.

The process according to the invention is especially suitable for producing the aliphatic polyesters: polybutylene adipate (PBA), polybutylene succinate adipate (PBSA), polybutylene succinate sebacate (PBSSe), polybutylene sebacate (PBSe) and particularly preferably polybutylene succinate (PBS). Aliphatic polyesters are marketed, for example, by Showa Highpolymers under the name Bionolle and by Mitsubishi under the name GS Pla.

The aliphatic polyesters produced with the process according to the invention generally have viscosity numbers according to DIN 53728 of 150 to 320 $cm^3/g$ and preferably 150 to 250 $cm^3/g$.

The MVR (melt volume rate) according to EN ISO 1133 (190° C., 2.16 kg weight) is generally 0.1 to 150 $cm^3/10$ min, preferably 10 to 150 $cm^3/10$ min.

The acid numbers according to DIN EN 12634 are generally 0.01 to 1.2 mg KOH/g, preferably 0.1 to 1.0 mg KOH/g and especially preferably 0.1 to 0.7 mg KOH/g.

The recited aliphatic and semiaromatic polyesters and the polyester mixtures according to the invention are biodegradable.

In the context of the present invention the feature "biodegradable" is fulfilled for a substance or a substance mixture when this substance or the substance mixture has a percentage degree of biodegradation according to DIN EN 13432 of at least 90%.

Biodegradability generally results in the polyester (mixtures) decomposing in an appropriate and verifiable timeframe. The degradation may be effected enzymatically, hydrolytically, oxidatively and/or by the action of electromagnetic radiation, for example UV radiation, and may usually be brought about predominantly by the action of microorganisms such as bacteria, yeasts, fungi and algae. Biodegradability may be quantified for example when polyesters are mixed with compost and stored for a certain time. For example according to DIN EN 13432 002-free air is passed through matured compost during composting and said compost is subjected to a defined temperature program. Biodegradability is here defined via the ratio of the net $CO_2$ release from the sample (after subtracting the $CO_2$ release by the compost without a sample) to the maximum $CO_2$ release from the sample (calculated from the carbon content of the sample) as a percentage degree of biodegradation. Biodegradable polyester (mixtures) generally show distinct signs of degradation such as fungus growth and tear and hole formation even after just a few days of composting.

Other methods for determining biodegradability are described for example in ASTM D 5338 and ASTM D 6400.

EU Regulation 10/2011 specifies threshold values for plastics materials that are in contact with food products. Packaging materials made of non-purified aliphatic polyesters such as polybutylene succinate (PBS) do not meet the requirements of this standard and are therefore unsuitable for foodstuffs applications. Especially the cyclic impurities in the polyester such as THF, cyclic monomers, dimers, trimers and tetramers can migrate out of the packaging material under the various test conditions. The process according to the invention now provides aliphatic polyesters which are distinctly depleted in cyclic impurities and which comply with the threshold values stipulated in EU Regulation 10/2011. The process according to the invention has also proven more efficient than the processes described in EP-A 228399 and EP-A 2623540.

The process according to the invention is more particularly described hereinbelow:

In a preliminary step the dicarboxylic acids and diols and optionally the dihydroxyl compound and the hydroxycarboxylic acid described hereinabove are premixed. Generally 1.0 mol equivalents of a mixture of aliphatic dicarboxylic acids or their esters and 1.1 to 1.5 mol equivalents, preferably 1.2 to 1.4 mol equivalents, of aliphatic dihydroxyl compounds are premixed.

In a preferred procedure the dicarboxylic acids are employed as free acids. The mixture is mixed in the abovementioned mixing ratios—without addition of a catalyst—to afford a paste which is usually temperature controlled to 20-90° C.

Alternatively, the liquid esters of the dicarboxylic acids (component A) and the dihydroxyl compound and optionally further comonomers are mixed in the abovementioned mixing ratios—without addition of a catalyst—generally at a temperature of 40-200° C.

In a further alternative one or more dicarboxylic acids are esterified with the aliphatic diol to afford an oligomeric polyester having a viscosity of 5 to 15 $cm^3/10$ min and employed in the preliminary step.

In step a) the above-described paste, slurry and/or liquid (preliminary step) composed of aliphatic dicarboxylic acids, an aliphatic diol and optionally further comonomers is esterified in the presence of 0.001% to 1% by weight, preferably 0.03% to 0.2% by weight, based on the polymer amount after step b of a catalyst.

The excess diol component is generally distilled off and after distillative purification for example returned to the circuit.

In step a) either the total amount or a sub-amount—preferably 50 to 80 parts—of the catalyst are supplied. Typically employed catalysts are zinc, aluminum and especially titanium compounds. In addition, compared to tin, antimony, cobalt and lead compounds often used in the prior art such as tin dioctanate, titanium catalysts such as tetrabutyl orthotitanate or tetra(isopropyl)orthotitanate have the advantage that residual amounts of the catalyst or descendent products of the catalyst remaining in the product have a lower toxicity. This fact is particularly important in the case of the biodegradable polyesters, since they get directly into the environment, for example, in the form of composting bags or mulch films.

A temperature of 180° C. to 260° C., preferably 220° C. to 250° C., and a pressure of 0.6 to 1.2 bar, preferably 0.8 to 1.1 bar, are simultaneously established in step a). Step a) may be performed in a mixing apparatus such as a hydrocyclone for example. Typical residence times are 1 to 2 hours.

Step a) (esterification and pre-condensation) is advantageously performed in a single reactor such as for example a tower reactor (see for example WO 03/042278 and DE-A 199 29 790), wherein the reactor comprises the internals suitable for the particular step.

Reactors such as a shell and tube reactor, a tank cascade or a bubble column and especially a downflow cascade optionally comprising a degassing unit have proven advantageous for the pre-condensation. Generally established here are reaction temperatures of 230° C. to 270° C., preferably 240° C. to 260° C., and pressures at the beginning of step a) of 0.1 to 0.5 bar, preferably 0.2 to 0.4 bar, and at the end of step a) of 5 to 100 mbar, preferably 5 to 20 mbar. Residence times of 60 to 160 minutes allow production of aliphatic prepolyesters having a viscosity number according to DIN 53728 von 20 to 70 and preferably 25 to 55 $cm^3/g$. The acid numbers according to DIN EN 12634 at the end of step a) are generally 0.7 to 2 mg KOH/g.

Reactors which have proven particularly advantageous for the precondensation a) are the tower reactors described in detail in WO-A 03/042278 and WO-A 05/042615 in which the product stream is passed cocurrently through a single or multistage falling-film evaporator, wherein the reaction vapors—in particular water, THF, and, if dicarboxylic esters are used, alcohols—are drawn off at a plurality of sites distributed over the reactor. The cocurrent operating mode described in WO A 03/042278 and WO-A 05/042615 comprising continuous removal of the reaction vapors—at least at a plurality of sites—is expressly incorporated herein by way of reference.

The reaction vapours consisting essentially of water and, if dicarboxylic esters are used, of alcohol, of excess diol and—if the diol 1,4-butanediol is used—byproduct THF are subjected to distillative purification by customary processes and recycled into the process.

In the polycondensation step b) the precondensed polyester is optionally admixed with a deactivator for the catalyst. Contemplated deactivators include in particular phosphorus compounds, either organophosphites such as phosphonous acid or phosphorous acid or inorganic phosphites such as sodium phosphite or sodium hypophosphite. The use of deactivators is particularly advisable when highly reactive titanium catalysts are employed. The deactivators may be added in an amount of 0.001% to 0.1% by weight, preferably 0.01% to 0.05% by weight, based on the polymer amount after step b). A Ti/P ratio of 1.3-1.5:1 is preferred and 1.1-1.3:1 especially preferred.

The polycondensation is carried out in a so-called finisher. Apparatuses that have proven particularly suitable as finishers include in particular reactors such as a spinning-disc reactor or a cage reactor, as described in U.S. Pat. No. 5,779,986 and EP 719582. The latter reactor in particular accommodates the increasing viscosity of the polyester with increasing reaction time. Generally established here are reaction temperatures of 220° C. to 270° C., preferably 230° C. to 250° C. and pressures of 0.1 to 5 mbar, preferably 0.5 to 5 mbar. Residence times of 30 to 90 minutes, preferably 40 to 80 minutes, allow production of aliphatic polyesters having a viscosity number according to DIN 53728 of 70 to 130 cm$^3$/g and acid numbers according to DIN EN 12634 of 0.5 to 1.2 mg KOH/g, preferably 0.6 to 0.9 mg KOH/g. In order to limit the average residence time of the polymer melt the conveying of the melt through the finisher may be adjusted for example via a higher speed of rotation of the disc or of the cage. In this step typical molecular weights (Mn) are 10 000 to 25 000 and molecular weights (Mw) are 35 000 to 70 000.

In a preferred embodiment of the process according to the invention a finisher as described hereinabove (a spinning-disc reactor or a cage reactor) may be provided with a means which allows introduction of the entraining agent into the gas space of the finisher.

A suitable entraining agent is water which is introduced into the gas space of the finisher as steam.

The amount of the entraining agent is generally between 1% and 7% by weight, preferably 2% to 5% by weight, based on the polyester at the end of step b). Greater amounts of entraining agent result in an unacceptable impairment of the vacuum established in the finisher. At a lower entraining agent concentration the crude polyester is insufficiently depleted in cyclic impurities such as THF and cyclic monomers, dimers, trimers and tetramers of the polyester.

The entraining agent is introduced into the gas space of the finisher. This has the advantage that a homogeneous polyester film is formed in the finisher and for example blister formation or foaming in the polyester film are avoided.

In the finisher the polymer melt generally forms an average film thickness of less than 5 mm, preferably less than 2 mm and especially preferably less than 1 mm.

In an alternative embodiment of the process according to the invention an additional degassing apparatus B' is connected (step b') downstream of the polycondenser (finisher) (B). The entraining agent may then be introduced either into both degassing apparatuses finisher B and degassing apparatus B' or exclusively into the degassing apparatus B'.

Conditions similar to those described hereinabove apply to the degassing apparatus B' with the exception that at 3 to 40 minutes the residence times in the degassing apparatus B' are shorter than in the finisher B. The crude polyester is already polycondensed and excessive residence times would result in more severe degradation of the polycondensed crude polyester.

It may also be advantageous to reduce the activity of the reaction catalyst by addition of one-off or further amounts of the above-described deactivators such as for example phosphorous acid.

The temperatures employed in the degassing apparatus B' may be slightly lower than in the finisher and are generally 180° C. to 260° C. and preferably 200° C. to 240° C. The entraining agent is introduced into the gas space of the degassing apparatus B'. This has the advantage that a homogeneous polyester film is formed in the degassing apparatus B' and for example blister formation or foaming in the polyester film are avoided.

A suitable entraining agent is water which is introduced into the gas space of the degassing apparatus B' as steam.

The amount of the entraining agent is generally between 1% and 7% by weight, preferably 2% to 5% by weight, based on the polyester at the end of step b). Greater amounts of entraining agent result in an unacceptable impairment of the vacuum established in the degassing apparatus B'. At a lower entraining agent concentration the crude polyester is insufficiently depleted in cyclic impurities such as THF and cyclic monomers, dimers, trimers and tetramers of the polyester.

In the degassing apparatus B' the polymer melt generally forms an average film thickness of less than 5 mm, preferably less than 2 mm and especially preferably less than 1 mm.

Apparatuses suitable as degassing apparatuses B' include the spinning-disc reactor and cage reactor described hereinabove.

An apparatus particularly advantageously suitable as degassing apparatus B' is a thin film evaporator such as is more particularly described in the examples.

Finally also suitable as degassing apparatus B' is a falling film evaporator. To ensure residence times of 3 to 40 minutes a cascade of 2 to 100 falling film evaporators is generally connected in series.

WO 2014/195176 describes a process for drastically reducing the emissions of TOC (total organic carbon—such as for example THF) for aromatic or aliphatic-aromatic polyesters. The inventors have found that this is likewise possible for aliphatic polyesters such as PBS when before introduction into a degassing apparatus B' the crude polyester is introduced with 0.01% to 2% by weight of the acrylic acid polymer described in WO 2014/195176 and constructed from: a) 70% to 100% by weight of acrylic acid and b) 0% to 30% by weight of at least one other ethylenically unsaturated monomer copolymerizable with acrylic acid and selected from the group of monoethylenically unsaturated carboxylic acids.

The aliphatic polyesters obtainable by the process according to the invention such as for example PBS are suitable for numerous applications such as injection molded products, thermoforming products, films or foams. The aliphatic polyesters are often employed in mixtures with further biopolymers such as polylactic acid, polyhydroxyalkanoates, biodegradable aliphatic-aromatic polyesters, starch, mineral fillers or other additives such as for example lubricants, nucleating agents, plasticizers or pigments.

The process according to the invention makes it possible to achieve a distinct depletion of cyclic impurities. In the case of 1,4-butanediol-containing polyesters the residual THF content of the aliphatic polyester may generally be reduced to half or preferably a quarter and especially preferably a tenth of the original THF content. The purified aliphatic polyester generally has a residual THF content of less than 50 ppm, preferably less than 30 ppm and especially preferably less than 10 ppm.

The cyclic oligomers content of the aliphatic polyester can also be distinctly reduced. In the case of PBS for example the process according to the invention generally reduces the content of cyclic monomer and cyclic dimer by more than 30%, preferably more than 40% and in particular more than 50%. In a component part produced from the aliphatic polyester such as a film precisely these two cyclic oligomers undergo more severe migration than the correspondingly higher oligomers. The disruptive cyclic monomers and dimers in PBS may generally be reduced to less than 0.8% by weight, preferably less than 0.7% by weight and especially preferably less than 0.6% by weight of the polyester. The efficient depletion of the cyclic monomers and dimers in the process according to the invention makes it possible to obtain approval for contact with foodstuffs according to EU 10/2011.

To produce these polyester mixtures or polyester formulations it has proven advantageous when after the degassing apparatus B or B' or optionally after chain extension the aliphatic polyester depleted of cyclic impurities is continuously sent for compounding with further polymers and auxiliaries without intermediate isolation such as for example underwater granulation. In addition to the cost-saving achieved by omitting the granulation step the aliphatic polyester need not be melted. Renewed formation of cyclic impurities that might result from thermal stress can therefore be avoided.

In the optional chain extension (step c) the polycondensed polyester is introduced into an extruder, a continuous kneader (List reactor) or a static mixer together with 0.01% to 4% by weight, preferably 0.1% to 2% by weight and especially preferably 0.5% to 1.2% by weight based on the polyester of a chain extender. Internals that may be employed include: in the case of a static mixer SMR, SMX, or SMXL elements or combinations thereof, for example from Sulzer Chemtech AG, Switzerland. Examples of a List reactor include depending on the field of application a single-screw DISCOTHERM B reactor or twin-screw CRP and ORP reactors. Suitable extruders include single-screw or twin-screw extruders.

Suitable chain extenders include the above-described isocyanates or isocyanurates C1, peroxides C2 and epoxides C3a. These diisocyanates are selected for example from the group consisting of tolylene 2,4-diisocyanate, tolylene 2,6-diisocyanate, 4,4'- and 2,4'-diphenylmethane diisocyanate, naphthylene 1,5-diisocyanate, xylylene diisocyanate, hexamethylene diisocyanate, isophorone diisocyanate and methylenebis(4-isocyanatocyclohexane). Hexamethylene diisocyanate is particularly preferred.

The chain extension reaction (step c) is carried out at reaction temperatures of 220° C. to 270° C., preferably 230° C. to 250° C., and at superatmospheric pressure or atmospheric pressure depending on the system used. Residence times of 2 to 30 minutes, preferably 4 to 15 minutes, allow production of aliphatic/aromatic polyesters having a viscosity number according to DIN 53728 of 160 to 250 cm$^3$/g and acid numbers according to DIN EN 12634 of preferably 0.5 to 1.2 mg KOH/g and especially preferably of 0.6 to 1.0 mg KOH/g.

The MVR (melt volume rate) according to EN ISO 1133 (190° C., 2.16 kg weight) after step c is generally 0.5 to 6.0 cm$^3$/10 min, preferably 1.0 to 5.0 cm$^3$/10 min and particularly preferably 1.5 to 3 cm$^3$/10 min.

The reactor in which the chain reaction is performed has the above-described internals which ensure thorough commixing of the product stream.

Due to the marked viscosity increase during the chain extension reaction it may be advantageous to run the chain extension reaction in the reactor only until the chain extender has fully reacted at least with one functional unit. Chain formation may be completed for example in a separate stirred tank or in a tube without internals. This makes it possible to avoid blockages and wall deposits.

The fully reacted melt is generally transferred directly to finishing, for example underwater granulation, via a melt filter.

The process according to the invention makes it possible to scalably and efficiently produce aliphatic polyesters which are also poor in cyclic impurities.

Methods of Measurement:

Viscosity numbers were determined according to DIN 53728 Part 3, Jan. 3, 1985. The solvent mixture: phenol/dichlorobenzene in a 50/50 weight ratio was employed.

The melt of volume rate (MVR) was determined according to ISO 1133. Test conditions of 190° C., 2.16 kg were used. The melting time was 4 minutes. The MVR describes the rate of extrusion of a molten plastics molding composition through an extrusion die of defined length and defined diameter under the above-described conditions: temperature, loading and piston position. The volume extruded in a defined time in the barrel of an extrusion plastometer is determined.

Performance Testing:

The molecular weights $M_n$ and $M_w$ of the semiaromatic polyesters were determined by SEC according to DIN 55672-1. Eluent: hexafluoroisopropanol (HFIP)+0.05% by weight potassium trifluoroacetate; calibration performed with narrow-distribution polymethyl methacrylate standards. Evaluation had to be aborted after 18.83 mL (about M=300 g/mol) since the chromatogram is disrupted by impurities in the sample/in the SEC eluent for smaller molar masses.

Melt volume rate MVR at 190° C. and 2.16 kg according to ISO 1133-1 DE

The oligomers were characterized by gas chromatography coupled with mass spectroscopy (GC-MS). 24.41 mg of sample were dissolved in 1.2 ml of dichloromethane. The ampoule was placed on a tube roller for 30 minutes. Ionization was by positive ion, chemical ionization and electron impact ionization. Individual resolution was employed.

Starting Materials 1,4-Butanediol from BASF SE, succinic acid from DSM N.V: and titanium orthotitanate from Sigma Aldrich.

Polyester i:

i-1 polybutylene succinate:

82.0 g of 1,4-butanediol, 82.7 g of succinic acid, 0.09 g of glycerol and 0.13 g of titanium orthotitanate were initially charged and melted at 120° C. The temperature was then increased to 160° C. and the resulting water was distilled off. A vacuum was then applied, the temperature was increased to 250° C. and polycondensation was carried out up to the desired viscosity number. The polyester had an MVR of 145 g/10 min. The Mw at the beginning of the degassing was 51700 Da and at the end of degassing was 40000 to 45000 Da. The Mn was 9000 Da at the beginning and 7000 to 10000 Da at the end of the degassing.

Performing the Degassing.

The degassing was performed in a thin film evaporator. The thin film evaporator had the following general characteristics: The evaporator surface was a tube having a mechanical stirring means in the middle. The melt was passed on to the vertical evaporator surface from above. The thin film evaporator generated a thin film (melt film) on the inner wall of a heated outer shell by mechanical means using a rotor. This resulted in continuous surface replacement, thus ensuring good mass transfer and therefore a high degassing performance. The degassing performance was achieved by addition of a stripping agent (for example water or steam) which was supplied in countercurrent. Also required for good degassing performance was a vacuum of not more than 5 mbar.

The shape and configuration of the individual rotor blades allowed transport of the viscous product to the discharge section of the processor. The film thickness and the melt conveying was likewise dependent on the geometry of the rotor blades. The large free gas volume allowed a high evaporative concentration ratio in one stage without the risk of product entrainment into the condensation system.

The experiments described in table 1 employed as the thin film evaporator a Sambay evaporator as described hereinabove, the outer shell being made of glass rather than metal.

The polyester i-1 was filled into the apparatus as a melt from above and to the side of the vertical glass surface/evaporator surface and melted. After melting the polyester was introduced into the apparatus and spread into a thin film by a stirring means. The stripping agent was introduced in countercurrent from below and a vacuum was then applied. Using the temperature, vacuum and stripping medium reported in table 1 the cyclic oligomers and further byproducts such as for example THF were withdrawn overhead and condensed in the cooler. After the experiment the polyester and the discharged substances were analyzed by gas chromatography.

TABLE 1

| Example | Unit | V1 | 2 | V3 | V4 | V5 |
|---|---|---|---|---|---|---|
| Temperature (melting) | ° C. | 190 | 190 | 190 | 190 | 190 |
| Temperature (degassing) | ° C. | 250 | 250 | 250 | 250 | 250 |
| Temperature (steam) | ° C. | 100 | 100 | 100 | 100 | 100 |
| Degassing length | cm | 30 | 30 | 30 | 30 | 30 |
| Average residence time | min | 30 | 30 | 30 | 30 | 30 |
| Film thickness | mm | 1 | 1 | 1 | 1 | 1 |
| Vacuum | mbar | 6.5 | 3 | 1.5 | — | — |
| Stripping medium | | $H_2O$ (d) | $H_2O$ (d) | — | $H_2O$ (d) | — |
| Amount | | 2% by weight | 2% by weight | — | 2% by weight | — |
| Speed of rotation | rpm | 350 | 350 | 350 | 350 | 350 |
| Oligomer proportion Start | | | | | | |
| <500 Da | % by weight | 0.8 | 0.8 | 0.8 | 0.8 | 0.7 |
| <1000 Da | % by weight | 1.7 | 1.7 | 1.7 | 1.8 | 1.8 |
| End | | | | | | |
| <500 Da | % by weight | 0.8 | 0.5 | 1.2 | 0.8 | 0.8 |
| <1000 Da | % by weight | 17 | 1.4 | 3.1 | 2.0 | 2.0 |
| Oligomer in cooler | | traces | yes | no | no | no |
| THF | | | | | | |
| Start | ppm | | 110 | 110 | | |
| End | ppm | | 30 | 130 | | |

Extraction Comparative Experiment:

Polyester granulate 1-i was initially charged and stirred at 70° C. with a mixture of ethanol and water (70%/30% by weight). The extractant was replaced every two hours. After eight hours the granulate was separated from the ethanol-water mixture and dried and the extracted oligomers were analyzed (see table 2).

TABLE 2

| Cyclic oligomers | Inventive (in the distillate) | Comparative experiment (in the extract) |
|---|---|---|
| $n_1$ | 10% | 5% |
| $n_2$ | 90% | 55% |
| $n_3$ | <1% | 35% |
| $n_4$ | <1% | 5% |
| $n_5$ | <1% | <1 |

The polyester produced by the inventive process (example 2) exhibited lower contents of cyclic monomer and dimer than the polyester purified by extraction. Films produced therefrom exhibited better migration characteristics than films produced from extracted polyester.

The invention claimed is:

1. A continuous process for producing an aliphatic polyester constructed from:
   i-a) 90 to 100 mol % based on the components i-a to i-b of succinic acid;
   i-b) 0 to 10 mol % based on the components i-a to i-b of one or more C6-C20 dicarboxylic acids;
   i-c) 99 to 100 mol % based on the components i-a to i-b of 1,3-propanediol or 1,4-butanediol;

i-d) 0% to 1% by weight based on the components i-a to i-c of a chain extender and/or branching agent comprising the steps of a) esterification, b) polycondensation and optionally c) chain extension, wherein during step b) in which the polycondenser functions as a degassing apparatus (B) and/or b') after the polycondensation in an additional degassing apparatus (B') the crude polyester is degassed at a pressure of 0.01 to 5 mbar in the presence of 1% to 7% by weight, based on the total weight of the crude polyester of water, introduced into the gas space of the degassing apparatus B and/or B' as an entraining agent.

2. The process as claimed in claim 1, wherein in step b—during the polycondensation—degassing is performed with an average residence time of 30 to 90 minutes.

3. The process as claimed in claim 1, wherein in step b'—after the polycondensation—degassing is performed with an average residence time of 3 to 40 minutes.

4. The process as claimed in claim 1, wherein the degassing apparatus has an internal temperature of 180° C. to 260° C.

5. The process as claimed in claim 1, wherein the crude polyester in the degassing apparatus has a film thickness of less than 2 mm.

6. The process as claimed in claim 1, wherein the aliphatic polyester comprises the aliphatic diol 1,4-butanediol.

7. The process as claimed in claim 1, wherein the aliphatic polyester is polybutylene succinate.

8. The process as claimed in claim 1, wherein the crude polyester has an MVR as claimed in DIN EN 1133-1 of Jan. 3, 2012 (190° C., 2.16 kg) of 10 to 150 cm$^3$/10 min.

9. The process as claimed in claim 1, wherein the degassing apparatus B' is a thin film evaporator.

10. The process as claimed in claim 1, wherein the degassing apparatus B and/or B' is a spinning-disc reactor or cage reactor.

11. The process as claimed in claim 1, wherein the degassing apparatus B' is a kneader or a planetary roll extruder.

12. The process as claimed in claim 1, wherein the degassing apparatus B' is a cascade of 2 to 100 falling film evaporators.

13. The process as claimed in claim 1, wherein before introduction into the degassing apparatus B' the crude polyester is mixed with 0.01% to 2% by weight of an acrylic acid polymer constructed from: a) 70% to 100% by weight of acrylic acid and b) 0% to 30% by weight of at least one other ethylenically unsaturated monomer copolymerizable with acrylic acid and selected from the group of monoethylenically unsaturated carboxylic acids.

14. The process as claimed in claim 1, wherein the polyester purified from the degassing plant B and/or B' is sent for compounding with further polymers and auxiliaries without a granulation step.

15. The process as claimed in claim 1, wherein i-b) is selected from the group consisting of adipic acid, azelaic acid, sebacic acid and brassylic acid.

16. The process as claimed in claim 1, wherein the degassing apparatus has an internal temperature of 200° C. to 240° C.

17. The process as claimed in claim 1, wherein the crude polyester in the degassing apparatus has a film thickness of less than 1 mm.

* * * * *